W. O. CORNWELL.
SEAT ARRANGEMENT FOR AUTOMOBILES AND OTHER STRUCTURES.
APPLICATION FILED APR. 5, 1916.
1,252,242. Patented Jan. 1, 1918.
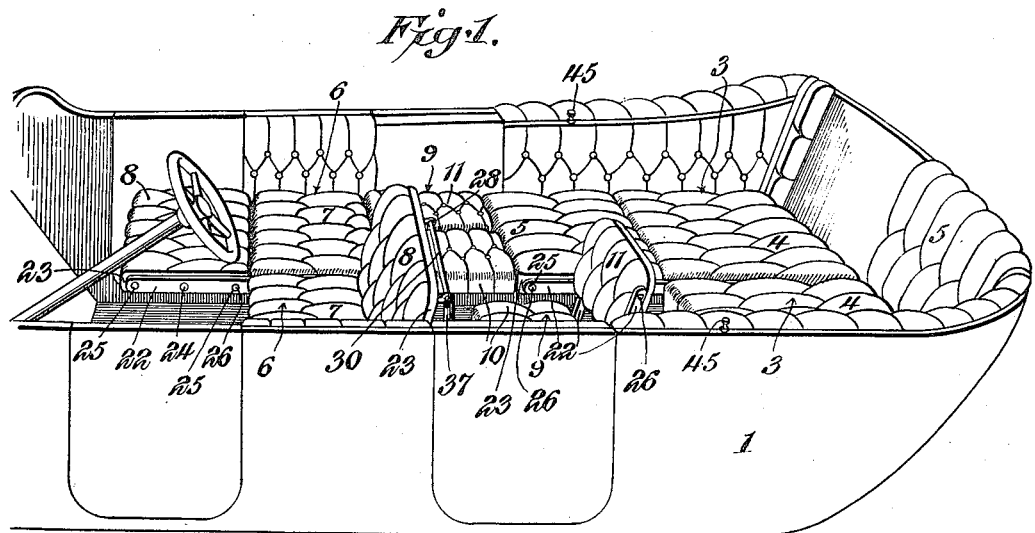
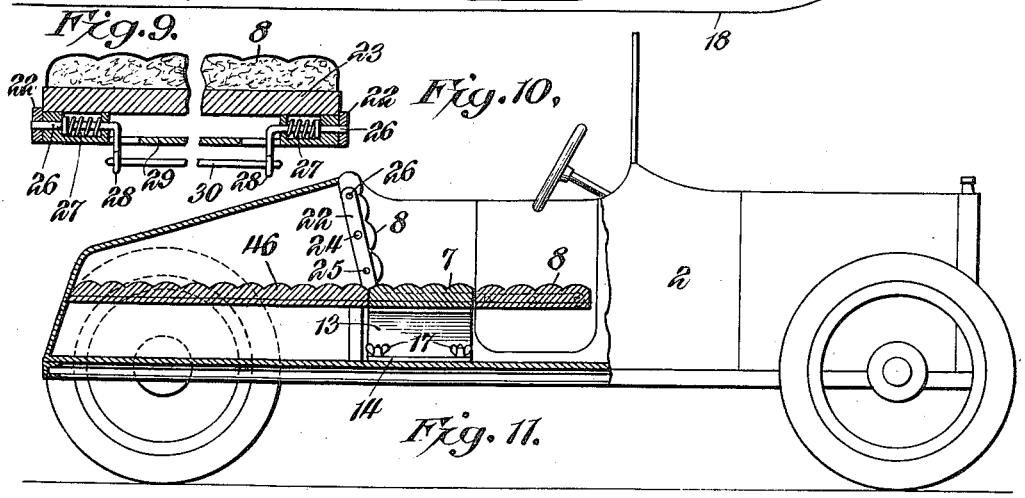
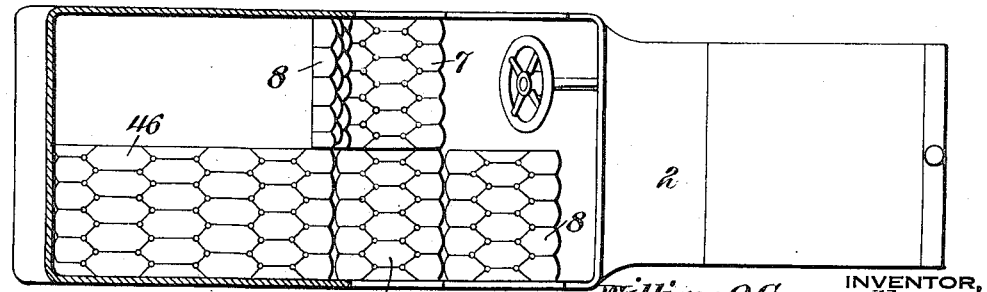
WITNESSES
Howard D. Orr.
F. T. Chapman
INVENTOR,
William O. Cornwell,
BY
ATTORNEYS

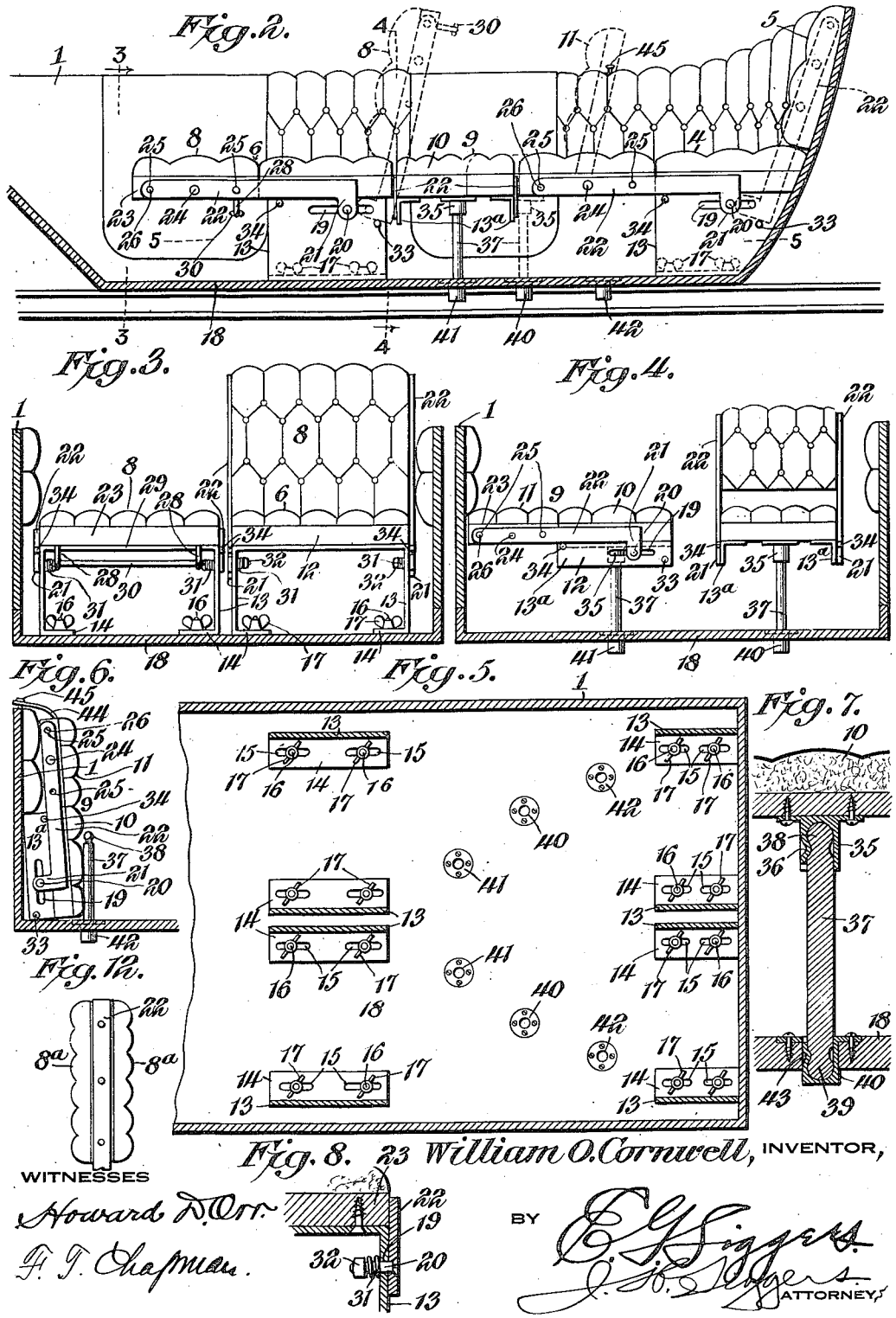

UNITED STATES PATENT OFFICE.

WILLIAM O. CORNWELL, OF INDIANAPOLIS, INDIANA.

SEAT ARRANGEMENT FOR AUTOMOBILES AND OTHER STRUCTURES.

1,252,242. Specification of Letters Patent. Patented Jan. 1, 1918.

Application filed April 5, 1916. Serial No. 89,159.

*To all whom it may concern:*

Be it known that I, WILLIAM O. CORNWELL, a citizen of the United States, residing at Indianapolis, in the county of Marion and State of Indiana, have invented certain new and useful Improvements in Seat Arrangements for Automobiles and other Structures, of which the following is a specification.

This invention has reference to seat arrangements for automobiles and other structures, and its object is to provide seats the backs of which may be moved from their ordinary upright positions at the rear of the seat portions into lowered positions at the front of the seat portions, whereby the seats of an automobile, if such be provided with the seats of the present invention, may be readily converted in whole or in part into a bed or beds either for sleeping purposes, or for ambulance purposes.

The prime purpose of the present invention is to produce a seating arrangement for automobiles although the seats may be used in other locations and for other purposes than sleeping or ambulance uses.

In the description to follow it will, for convenience of such description, be considered that an automobile is provided with the seating arrangement, without, however, any limitation of the invention to such particular purpose, and the term automobile is to be interpreted as broad enough to cover any vehicle to which the present invention may be applied.

The bodies of automobiles are customarily provided, in five or seven passenger types, with a wide rear seat and a front seat wide enough to accommodate the operator and a passenger side by side. Also in seven passenger bodies, auxiliary seats are provided between the front and rear seats, and these auxiliary seats are readily foldable up out of the way when not in use.

By the present invention the rear seat is divided into two seats with the backs individual thereto and so mounted that they may be moved forwardly from the customary upright position to a lowered and substantially horizontal position immediately in front of the front edge of the rear seat. In five passenger cars the spacing of the seats and the height of the backs of the rear seats are such that when such backs are lowered forwardly they occupy the space between the front edges of the respective rear seats and the rear edges of the corresponding front seats. The front seat of a five or seven passenger vehicle is also divided into two seats with backs individual thereto, and these backs are movable to a horizontal position in front of the front edges of the seats, thus extending the seat portions of the front seats toward the dash. Since each front and rear seat is divided centrally into two seats and the backs are individually movable, either or both sides of the vehicle may be formed into couches extending lengthwise of the vehicle.

In seven passenger cars the auxiliary seats are similarly constructed so that they produce filling in means whereby the effective continuity of the couch is not interfered with because the auxiliary seats then fill in the space between the front and rear seats caused by the extra length of the vehicle body.

Provision is made by the present invention for individualizing the seats so that on occasion they may be removed bodily from the vehicle or attached thereto, thus permitting the conversion of the vehicle for other uses than couch or ambulance purposes. The manner of mounting the backs upon the supporting portions of the seats permits the use of the seats in other locations than in automobiles.

The invention will be best understood from a consideration of the following detailed description taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a perspective view of a body of a seven passenger automobile equipped with seats of the present invention.

Fig. 2 is a longitudinal section of the structure of Fig. 1 with the seats extended in couch form and the backs of the seats shown in dotted lines in the elevated position.

Fig. 3 is a section on the line 3—3 of Fig. 2 with distant parts omitted.

Fig. 4 is a section on the line 4—4 of Fig. 2 with distant parts omitted.

Fig. 5 is a section on the line 5—5 of Fig.

2 with the supporting posts for the auxiliary seats omitted.

Fig. 6 is a detail section showing the manner of disposal of auxiliary seats when not in use.

Fig. 7 is a detail section through one of the supporting posts for the auxiliary seats showing the manner of connecting the supporting post to the floor of the vehicle, and also to the body of the seat.

Fig. 8 is a detail section showing the manner of hinging the arms of the back of the seat to the body of the seat.

Fig. 9 is a detail section showing the manner of locking the back of the seat to the supporting arms therefor.

Fig. 10 is a view partly in longitudinal section and partly in elevation of a runabout type of vehicle equipped with the invention.

Fig. 11 is a plan view of the structure shown in Fig. 10.

Fig. 12 is a view showing a modification of the arrangement of the back of the seat.

Referring to the drawings there is shown in certain of the figures a vehicle body 1, which in the particular showing is that of the body of a seven passenger automobile. In others of the figures there is shown a body 2 corresponding to the body of a two passenger runabout. These showings may be taken as typical of any suitable vehicle body whether that of an automobile or other vehicle, or of any suitable support to which the invention may be applied.

In the showing of Fig. 1 and associated figures, there is shown a rear seat 3 having seat cushions 4 and back cushions 5. There is also shown a front seat 6 having front cushions 7 and back cushions 8. In addition to the seats so far described the seven passenger body of Fig. 1 and associated figures is provided with auxiliary seats 9 having seat cushions 10 and back cushions 11.

Since the seat elements supporting the cushions may be all alike, except for size, a description of one seat may be taken as applying to all the seats. Each seat has a supporting frame 12 for the respective seat cushion, and this frame is supplied with side supports or legs 13 which may be made of sheet metal or other suitable material elongated in the direction of the length of the vehicle. Each leg 13 has its lower edge bent into a flange 14 constituting a foot for the corresponding leg of the seat, and such flange is provided with longitudinal slots 15 for the passage of bolts 16 each supplied with a thumb nut 17. The bolts 16 rise from the floor of the body of the vehicle, which floor is indicated at 18, and may be either permanently or removably attached thereto, the thumb nuts providing ready means for the fixing of the seats in place, or the release of the seats from the bolts, whereby the seats may be secured in the vehicle body or removed bodily therefrom for various purposes.

The bodies 12 and legs 13 do not apply to the auxiliary seats, but do apply to the main front and rear seats of the vehicle. Each leg 13 has near its upper end a longitudinally extended slot 19 traversed by a pintle 20 passing through an angle extension 21 of an arm 22, there being two such arms to each individual front or back seat. The arms 22 are on opposite sides of a back frame 23 carrying the corresponding back cushion 5 or 8, as the case may be. Ordinarily the frame 23 is attached to the arms 22 by trunnions 24 so that the backs may be reversed upon the axis of the trunnions with respect to the arms 22. For this purpose each arm has perforations 25 on opposite sides of the trunnion 24 and the back frame 23 carries oppositely directed pins 26 each urged to a projected position by a spring 27 individual to the pin. Said pins 26 are so located as to engage in one or the other of the perforations 25, whereby the back frame 23 on being turned in one direction or the other about the trunnions 24 may be locked in the desired positions by the engagement of the pins 26 in the respective perforations 25. Each pin 26 terminates in an angle extension 28 projecting through the back 23 or a cover plate 29 thereof into accessible position, so that both pins may be manipulated at one time to release both sides of the back frame 23 from the respective arms 22. In the case of the back of the front seat the projections 28 may be utilized to support a lap robe rail 30.

Each pintle 20 may be in the form of a bolt with a compression or spring washer 31 between the nut 32 of the bolt and the corresponding face of the respective leg 13, whereby the arms 22 are held with considerable friction against the legs 13 and consequently these arms are only moved on the axis of the pintles by the exertion of considerable force.

The spring washers may be of a type to be found upon the market, so that it is unnecessary to either show them or describe them in detail. Each leg 13 has projections or knobs 33, 34, respectively, so situated that when the back is in the normal upright position the projection 21 will engage the knob 33, thus supporting the back in such upright position. When the arms 22 are moved forwardly and downwardly the pins or knobs 34 support these arms in conjunction with the hinge pintles 20. The slots 19 permit movements of the arms lengthwise of the vehicle, so that the back cushions 5 or 8, as the case may be, may be brought into edge engagement with the seat cushions 4 or 7, as the case may be. In lowering the backs from their normal upright position to the forward down position, the arms 22 are moved lengthwise of the slots 19, so that there may be no interference of the backs of the seats with the seat cushions, and then in order that the parts may be in snug engagement, the arms 22 may be moved rearwardly in the slots 19, the frictional engagement of the arms with the legs 13 insuring the maintenance of the adjusted position of the parts.

In a seven passenger car the auxiliary seats 9 have seat frames and back frames the same as is provided with the main seats of the vehicle, but instead of furnishing these seats with legs 13 each seat frame 12 has edge flanges 13ª in which the slots 19 are formed and to which the arms 22 are hinged by the pintles 20. Each seat frame 12 has about midway of its length and breadth a socket 35 made fast thereto. On one side of this socket is a spring catch tongue 36. The auxiliary seats are each supported upon a post 37 formed at one end with a knob-like portion 38 adapted to the socket 35 and removably held thereto by the spring catch 36. The other end of the post 37 has a similar knob-like portion 39 adapted to any one of a number of sockets 40, 41 or 42 secured in the floor 18 and also provided with spring tongues 43 similar to the tongue 36 and for a like purpose.

The several sockets 40, 41 and 42 provide for differentially locating the posts 37. The socket 40 carries the post 37 in the ordinary position of the auxiliary seat when the latter is being occupied by a person in the seated position. The socket 41 receives the post 37 when the auxiliary seat has the back moved forward into the substantially horizontal position on a level with the seat portion of such seat. The socket 42 is designed to receive the post 37 when the auxiliary seat is removed from the post and stood up against the side of the vehicle with the post 37 holding the lower portion of the seat against the side of the vehicle and what then constitutes the top of the seat held by a strap 44 which may be fast to the back of the auxiliary seat, and this strap is adapted to be held by a button 45 on the respective side of the vehicle body.

The seat arrangement is such that the seats and backs are ordinarily in position to support the passengers in the vehicle in the ordinary seating position. If it be desired to convert the vehicle into a couch either for sleeping purposes, or for ambulance purposes, the back portions of either or both of the rear seats are moved forwardly upon the hinges 20, the backs being reversed in position by a suitable manipulation of the catch pins 26. In a seven passenger car this causes a forward extension of the seat cushions 4 by the back cushions 5 leaving, however, a space between the then front edge of the back cushion or cushions 5 and the corresponding front seat cushions 7. The auxiliary seats are treated in a like manner to bring the back cushions of these seats on a level with the seat cushions, and then by placing the posts 37 in the sockets 41 and positioning the seats with the extended backs crosswise of the vehicle, the space between the front edges of the extended backs of the rear seat and the rear edges of the seat cushions of the front seat are occupied by the cushions of the auxiliary seats. The backs of the front seat are lowered in like manner, so that the cushions 8 constitute a forward extension of the seat cushions 7. If all the backs of all the seats have been lowered in the manner described, the body of the vehicle is converted into a couch having a width equal to the width of the vehicle and a length from the rear of the vehicle body to a point approaching the dash and extending forwardly from the seat portion of the front seat by the extent of the cushions constituting the back cushions of the front seat.

In case of injury or sickness it may be only necessary to extend into couch form the backs of the seats on one side of the vehicle, allowing the chauffeur and a doctor or nurse or both to occupy the other side of the vehicle. In the case of a five passenger car the auxiliary seats are of course absent, but the spacing apart of the front and rear seats is such that the forwardly folded down backs of the rear seats will reach to the rear edges of the seat portions of the front seats, and the couch constructions are then shorter by the width of the auxiliary seats. Otherwise the arrangement is the same as described with reference to Fig. 1.

In Figs. 10 and 11 there is shown an arrangement especially adapted for automobiles intended for the use of doctors. Extending to the rear of the seat on a level with the seat cushions 7 is a suitably cushioned support 46 which when the back cushion 8 is extended on a level with the cushion 7 forms with the cushions 7 and 8 a couch upon which a patient may lie in a recumbent position. It is only necessary that one half of the front seat be arranged with a back which may be lowered for couch purposes, although, of course, the vehicle may be provided with a cushioned support 46 as wide as the body of the vehicle, in which case the entire front seat may be provided with back portions to be lowered forwardly.

It is not always needful to have the hinged back reversible, since, as shown in Fig. 12, which is intended to represent the back of the front seat only, the back may have cushions 8 as shown in the other views and other cushions 8ª on the reverse side. With a back so formed, and this may represent the back of any of the seats in addition to that of the front seat, the lowered back without reversal will present cushions on its then upper face.

What is claimed is:—

1. A vehicle body having front and rear seats spaced apart in the direction of the length of the body, with the front seat spaced from the front of the body, the seat portions of both seats being in fixed relation, in the installed position, to the vehicle body, and the backs of both the front and rear seats being movable forwardly from a normally upright position to a substantially horizontal position in front of the seat portions of the respective seats, whereby there is produced a couch or support in one plane from the rear edge of the rear seat to beyond the front edge of the front seat, with the extension beyond the front seat equal to the height of the back of the front seat from top to bottom and encroaching to a corresponding distance upon that portion of the vehicle body in front of the seat portion of the front seat.

2. A vehicle body having front and rear seats spaced apart in the direction of the length of the body, with the front seat spaced from the front of the body, the seat portions of both seats being in fixed relation, in the installed position, to the vehicle body, and the backs of both the front and rear seats each having supports with hinge and forwardly slidable connections provided with friction holding means, whereby the back portions of both seats may be moved forwardly of the vehicle body and downwardly into a substantially horizontal position in front of the corresponding seat portions to constitute forward prolongations of said seat portions toward the front of the vehicle.

3. A vehicle body having seats with relatively fixed seat portions, and back portions having supporting arms on opposite sides each provided with hinge connections to the seat portions, said seat portions having elongated slots extending lengthwise of the vehicle and the hinge connections engaging in said slots, whereby the back portions are movable forwardly and downwardly on the hinge connections and bodily forwardly and rearwardly of the seat portions to constitute forward prolongations of the seat portions when the back portions are in the forward horizontal position, and means for supporting the back portions in their adjusted positions.

4. A vehicle body having seats with relatively fixed seat portions having slots extending lengthwise of the vehicle and back portions having supporting arms on opposite sides each provided with hinge connections engaging in said slots, whereby the back portions are movable forwardly and downwardly on the hinge connections and bodily forwardly and rearwardly of the seat portions to constitute forward prolongations of the seat portions when the back portions are in the forward horizontal position, the seat portions having projections constituting supporting stops for the arms to hold the backs in either the upright or the horizontal position.

5. A vehicle body having seats with relatively fixed seat portions, and back portions having supporting arms on opposite sides each provided with hinge connections to the seat portions, said seat portions having elongated slots extending lengthwise of the vehicle and the hinge connections engaging in said slots, whereby the back portions are movable forwardly and downwardly on the hinge connections and bodily forwardly and rearwardly of the seat portions to constitute forward prolongations of the seat portions when the back portions are in the forward horizontal position, the seat portions having projections constituting supporting stops for the arms to hold the backs in either the upright or the horizontal position, and the hinge connections being provided with friction holding means permitting movements of the hinge connections along the slots they traverse.

6. A vehicle body having front and rear seats with relatively fixed seat portions, and back portions provided with supports hinged to the seat portions, and said back portions being reversible with respect to the supports, the hinge connections having coacting pin and slot portions with the slots extending in the direction of the length of the vehicle, whereby the back portions may be turned on the hinges from an upright to a substantially horizontal position, and may be moved bodily forward and back along the slots in the hinge connections to locate the back portions forwardly of and in contact with the front edges of the seat portions.

7. A vehicle body having front and rear seats with relatively fixed seat portions, and back portions movable with respect to the seat portions from a substantially upright position forwardly to a substantially horizontal position and each there constituting a forward prolongation of the seat portion, and auxiliary seats between the front and rear seats and provided with backs movable forwardly from an upright position to constitute a forward prolongation of the seat portion of the auxiliary seat, whereby the front and rear and auxiliary seats may be adjusted into a continuous couch, the vehicle body having a plurality of supports for each auxiliary seat located in different positions with respect to the front and rear seats, whereby the latter may be moved bodily from the normal seating position to the horizontal couch position.

8. A vehicle body having front and rear seats with relatively fixed seat portions, and back portions movable with respect to the seat portions from a substantially upright position forwardly to a substantially horizontal position and each there constituting a forward prolongation of the seat portion, and auxiliary seats between the front and rear seats and provided with backs movable forwardly from an upright position to constitute a forward prolongation of the seat portion of the auxiliary seat, whereby the front and rear and auxiliary seats may be adjusted into a continuous couch, the vehicle body having a plurality of supports for each auxiliary seat, whereby the latter may be moved bodily from the normal seating position to the horizontal couch position, and said vehicle body having other supporting means for the auxiliary seats located adjacent to the sides of the vehicle whereby the latter may be held in a folded condition against the respective sides of the vehicle body when not in use.

9. A seat structure comprising a seat portion and a back portion, and supporting arms for the back portion pivotally connected to the seat portion, the pivotal connections including pintles and elongated slots in the seat portion with the pintles provided with friction means for resisting movements of the pintles lengthwise of the slots, and said slots extending lengthwise of the seat portion, and said seat structure having stop means for holding the back portion in the adjusted positions.

10. A seat structure comprising a seat portion and a back portion, and supporting arms for the back portion pivotally connected to the seat portion, the pivotal connections including pintles and elongated slots in the seat portion with the pintles provided with friction means for resisting movements of the pintles lengthwise of the slots, and said slots extending lengthwise of the seat portion, and said seat portion having spaced stop means associated with the arms to support the latter in either the upright or the lowered position of the back.

In testimony whereof I affix my signature in presence of two witnesses.

WILLIAM O. CORNWELL.

Witnesses:
EDWARD H. EASTER,
WILLIAM ALLAN WOOD.